(12) United States Patent
Iwazaki et al.

(10) Patent No.: US 11,887,334 B2
(45) Date of Patent: Jan. 30, 2024

(54) INFORMATION MANAGEMENT SYSTEM, AND IN-VEHICLE DEVICE, PORTABLE DEVICE, AND IMAGE MANAGEMENT SERVER USED THEREIN

(71) Applicant: TOYOTA JIDOSHA KABUSHIKI KAISHA, Aichi-ken (JP)

(72) Inventors: Katsuhiko Iwazaki, Aichi-ken (JP); Yu Watanabe, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 120 days.

(21) Appl. No.: 17/469,795

(22) Filed: Sep. 8, 2021

(65) Prior Publication Data

US 2022/0076445 A1 Mar. 10, 2022

(30) Foreign Application Priority Data

Sep. 9, 2020 (JP) ................................ 2020-151149

(51) Int. Cl.
| | | |
|---|---|---|
| *G06K 9/00* | (2022.01) | |
| *G06T 7/73* | (2017.01) | |
| *G06T 5/50* | (2006.01) | |
| *G06V 10/25* | (2022.01) | |
| *G06V 20/56* | (2022.01) | |

(52) U.S. Cl.
CPC ................. *G06T 7/74* (2017.01); *G06T 5/50* (2013.01); *G06V 10/25* (2022.01); *G06V 20/56* (2022.01); *G06T 2207/30252* (2013.01); *G06V 2201/07* (2022.01)

(58) Field of Classification Search
CPC ............................................. G06V 20/56–588
See application file for complete search history.

(56) References Cited

U.S. PATENT DOCUMENTS

| | | | |
|---|---|---|---|
| 2017/0068873 A1* | 3/2017 | Hagawa | ................. G06N 20/00 |
| 2018/0336426 A1 | 11/2018 | Suzuki et al. | |
| 2019/0026829 A1 | 1/2019 | Nakata et al. | |
| 2020/0042826 A1 | 2/2020 | Ishikawa et al. | |
| 2020/0195945 A1* | 6/2020 | Sogabe | ................. H04N 19/42 |
| 2020/0242154 A1 | 7/2020 | Haneda et al. | |
| 2022/0299324 A1* | 9/2022 | Carbery | ................. G01C 21/28 |

FOREIGN PATENT DOCUMENTS

| | | | | |
|---|---|---|---|---|
| CN | 110445617 A | | 11/2019 | |
| JP | 2012145376 A | * | 8/2012 | ............ G01C 21/36 |
| JP | 2017-054424 A | | 3/2017 | |

(Continued)

*Primary Examiner* — Emily C Terrell
*Assistant Examiner* — Owais Iqbal Memon
(74) *Attorney, Agent, or Firm* — HAUPTMAN HAM, LLP (57) ABSTRACT

The in-vehicle device transfers the selected image selected by the user from the photographed images stored in the storage device and the selected vehicle state, which is the vehicle state when the selected image is captured, to the form terminal. The portable device transmits the selected image and the selected vehicle state to the image management server only when the transmission is permitted by the user. The image management server determines whether or not the selected image is a rare image using the selected image and the selected vehicle state, and stores the selected image in the image storage device when the selected image is determined to be a rare image.

16 Claims, 6 Drawing Sheets

(56) References Cited

FOREIGN PATENT DOCUMENTS

| | | | | |
|---|---|---|---|---|
| JP | 2018-195237 | A | 12/2018 | |
| JP | 6448872 | B1 | 1/2019 | |
| JP | 2019-029013 | A | 2/2019 | |
| JP | 2019197525 | A * | 11/2019 | ............ G06Q 50/10 |
| JP | 2019197525 | A | 11/2019 | |
| JP | 2020-021372 | A | 2/2020 | |
| JP | 2020-123174 | A | 8/2020 | |
| KR | 10-1473866 | B1 | 12/2014 | |

* cited by examiner

INFORMATION MANAGEMENT SYSTEM, AND IN-VEHICLE DEVICE, PORTABLE DEVICE, AND IMAGE MANAGEMENT SERVER USED THEREIN

CROSS-REFERENCE TO RELATED APPLICATIONS

The present disclosure claims priority to Japanese Patent Application No. 2020-151149 filed Sep. 9, 2020, which is incorporated herein by reference in its entirety including specification, drawings and claims.

TECHNICAL FIELD

The present invention relates to an information management system, and an in-vehicle device, a portable device, and an image management server used in the information management system.

BACKGROUND

Conventionally, as a system of this type, there has been proposed a system including an edge device mounted on a vehicle together with a drive recorder, a drive recorder information server connected to a plurality of edge devices via a communication network, and an external server connected to the communication network (for example, see patent literature 1). In this system, the edge device extracts the feature information of the image taken by the drive recorder and detects whether or not a predetermined event such as a traffic accident has occurred based on the feature information. Then, when the edge device detects a predetermined event has occurred, the edge device transmits the characteristic information of the image when the predetermined event has been detected to the drive recorder information server together with the information of the position and time at which the image was photographed. The drive recorder information server generates accident summary information indicating a summary of a traffic accident that has occurred based on the information acquired from the edge device, and provides the accident summary information to the external server. The external server provides traffic accident information to a number of drivers utilizing the server.

CITATION LIST

Patent Literature

PTL 1: JP2019-197525

SUMMARY

However, in the above-described system, feature information is extracted from an image photographed by the drive recorder, and when the feature information is extracted, the information of the image, the position, and the time is automatically transmitted to the drive recorder information server. Therefore, a large amount of images may be transmitted regardless of whether or not it is necessary. In this case, the amount of communication becomes excessive.

An information management system of the present invention and an in-vehicle device, a portable device, and an image management server used therein have a main object of reducing a communication amount and a communication frequency of an image including a rare image between a user and the image management server.

The information management system of the present invention and the in-vehicle device, portable device, and image management server used therein adopt the following means in order to achieve the above-mentioned main object.

An information management system of the present invention including: an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device; a portable device configured to acquire and transmit the photographed image and the detected vehicle state transferred from the transfer device; and an image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the portable device transmits the selected image and the selected vehicle state to the image management server only when transmission is permitted by the user, wherein the image management server includes determining means that determines whether the selected image is a rare image using the selected image and the selected vehicle state received from the portable device, and an image storage device that stores the selected image when the selected image is determined to be the rare image by the determining means.

In the information management system of the present invention, the in-vehicle device transfers the selected image selected by the user from the photographed image stored with time taken by the camera and the detected vehicle state (selected vehicle state) when photographing the selected image to the portable device. Here, the vehicle state includes at least a portion of the vehicle speed, acceleration, yaw rate, wheel speed, gradient, vehicle position, shift position, accelerator opening, brake pedal position, and the like. The selected image and the selected vehicle state transferred to the portable device are transmitted from the portable device to the image management server only when the transmission is permitted by the user. For this reason, the communication volume and frequency of the moving image including the rare image between the user and the image management server can be reduced as compared with the case where the selected image automatically transmits the image that meets the predetermined conditions to the image management server. Since the image management server determines whether or not the selected image is a rare image for the selected image selected and permitted by the user and transmitted from the portable device, it is possible to impose a step sufficient for determining a rare image. As a result, it is possible to more appropriately determine and accumulate the rare image. The "image" includes a still image and a moving image, and the same applies to the following description.

The in-vehicle device of the present invention is an in-vehicle device constituting the above-mentioned information management system of the present invention. In-vehicle device used in the information management system, wherein the information management system including: the in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device; a portable device configured to acquire and transmit the photographed image and the detected vehicle state transferred from the transfer device; and an image management server configured to receive the photographed image and the detected vehicle state transmitted from the portable device, wherein the portable device transmits the selected image and the selected vehicle state to the image management server only when transmission is permitted by the user, wherein the image management server includes determining means that determines whether the selected image is a rare image using a selected image and a selected vehicle state received from the portable device, and an image storage device that stores the selected image when the selected image is determined to be the rare image by the determining means, wherein the control device of the in-vehicle device configured to transfer a selected image selected by a user from the photographed images stored in the storage device and a selected vehicle state, which is a vehicle state when the selected image is photographed stored in the storage device to the portable device The in-vehicle device of the present invention is used in the information management system. The selected image and the selected vehicle state transferred to the portable device are transmitted from the portable device to the image management server only when the transmission is permitted by the user. The selected image and the selected vehicle state transferred to the portable device are transmitted from the portable device to the image management server only when the transmission is permitted by the user. As described above, in the information management system including the in-vehicle device of the present invention, the selected image selected by the user and the vehicle state when the selected image is photographed are transferred to the portable device, and the selected image and the selected vehicle state are transmitted from the portable device to the image management server only when the transmission is permitted by the user, so that the communication amount and the communication frequency of the moving image including the rare image between the user and the image management server can be suppressed as compared with the case where the selected image that conforms to the predetermined condition is automatically transmitted to the image management server.

The portable device of the present invention is a portable device constituting the above-mentioned information management system of the present invention. In other words, the portable device used in the information management system, wherein the information management system including: an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device; the portable device configured to acquire and transmit the photographed image and the detected vehicle state transferred from the transfer device; and an image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the image management server includes determining means that determines whether the selected image is a rare image using the selected image and the selected vehicle state received from the portable device, and an image storage device that stores the selected image when the selected image is determined to be the rare image by the determining means, wherein the portable device configured to transmit the selected image and the selected vehicle state to the image management server only when transmission is permitted by the user.

The portable device of the present invention is used in an information management system. In the information management system, the in-vehicle device transfers the detected vehicle state (selected vehicle state) when photographing the selected image and the selected image selected by the user of the captured image stored with the time taken by the camera to the portable device. The selected image and the selected vehicle state transferred to the portable device are transmitted from the portable device to the image management server only when the transmission is permitted by the user. As described above, in the information management system including the portable device of the present invention, the selected image selected by the user and the vehicle state when the selected image is photographed are transferred to the portable device, and the selected image and the selected vehicle state are transmitted from the portable device to the image management server only when the transmission is permitted by the user. For this reason, the communication volume and frequency of the moving image including the rare image between the user and the image management server can be suppressed as compared with the case where the selected image automatically transmits the image that meets the predetermined conditions to the image management server.

The image management server of the present invention is an image management server constituting the above-mentioned information management system of the present invention. That is, the image management server used in the information management system, wherein the information management system including: an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device; a portable device configured to acquire and transmit the photographed image and the detected vehicle state transferred from the transfer device; and the image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the portable device transmits the selected image and the selected vehicle state to the image management server only when transmission is permitted by the user, wherein the image management server comprising determining means that determines whether the selected image is a rare image using the selected image and the selected vehicle state received from the portable device, and an image storage device that stores the selected image when the selected image is determined to be the rare image by the determining means.

The image management server of the present invention is used in an information management system. In the information management system of the present invention, the in-vehicle device transfers the selected image selected by the user from the photographed image stored with time taken by the camera and the detected vehicle state (selected vehicle state) when photographing the selected image to the portable device. The selected image and the selected vehicle state transferred to the portable device are transmitted from the portable device to the image management server only when the transmission is permitted by the user. As described above, in the information management system of the present invention, since the selected image selected by the user and the vehicle state (the selected vehicle state) when the selected image is photographed are transferred to the portable device, and the selected image and the selected vehicle state are transmitted from the portable device to the image management server only when the transmission is permitted by the user, it enables to reduce the communication amount and the communication frequency of the moving image including the rare image between the user and the image management server as compared with the case where the selected image that conforms to the predetermined condition is automatically transmitted to the image management server. Since the image management server determines whether or not the selected image is a rare image from the selected image selected and permitted by the user and transmitted from the portable device, it is possible to impose a step sufficient for determining a rare image. As a result, it is possible to more appropriately determine and accumulate the rare image.

DETAILED DESCRIPTION OF EMBODIMENTS

The following describes some aspects of the present disclosure with reference to an embodiment.

Figure 1:
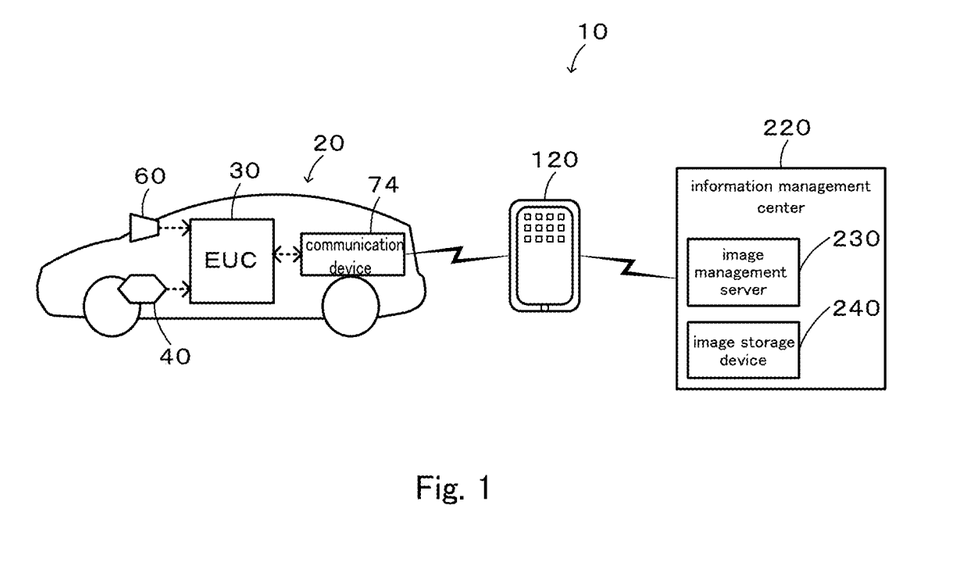
FIG. 1 is a configuration diagram showing an outline of a configuration of an information management system 10 according to an embodiment of the present invention.
Figure 2:
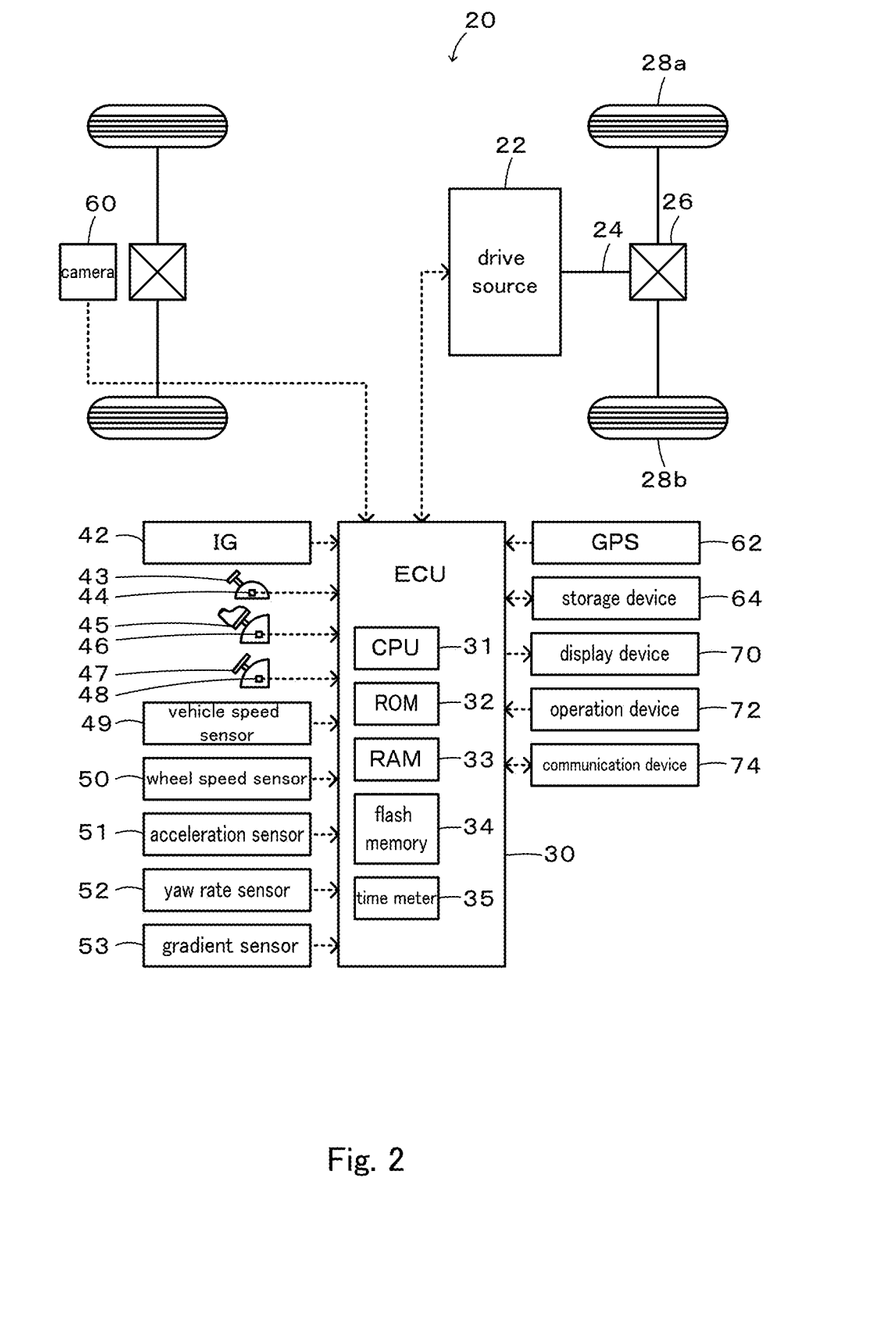
FIG. 2 is a configuration diagram showing a schematic of a configuration of an in-vehicle device 20 provided with the information management system 10 of the embodiment is a configuration diagram showing a schematic of a configuration of an in-vehicle device 20 provided with the information management system 10 of the embodiment.

FIG. 1 is a configuration diagram showing an outline of a configuration of an information management system 10 as an embodiment of the present invention, and FIG. 2 is a configuration diagram showing an outline of a configuration of an in-vehicle device 20 included in the information management system 10 of the embodiment. As shown, the information management system 10 of the embodiment includes an in-vehicle device 20 which is mounted, a portable device 120, and an image management center 220.

As shown in FIG. 2, the in-vehicle device 20 is mounted on a vehicle that travels by transmitting the driving force outputted from the drive source 22 to the driveshaft 24 to the drive wheels 28a and 28b via the differential gear 26. The drive source 22 may include an engine transmission system including an engine driven by using a hydrocarbon-based fuel such as gasoline or diesel oil and an automatic transmission, a hybrid system including an engine and a motor and a storage battery, an electric vehicle system including a motor and a storage battery, and a fuel cell system including a motor and a storage battery and a fuel cell.

The in-vehicle device 20 includes a camera 60, various sensors 40, a storage device 64, a display device 70, an operation device 72, a communication device 74, and an electronic control unit 30.

the camera 60 is disposed in front of the vehicle. A camera, for example, incorporated in the drive recorder storing vehicle speed, GPS (Global Positioning System) data, time, and photographed images may be used as the camera 60. The camera 60 may be disposed not only in front of the vehicle but also in the rear and lateral direction of the vehicle.

Various sensors 40 may include sensors detecting the status of a vehicle such as a vehicle speed sensor 49, a wheel speed sensor 50, an acceleration sensor 51, a yaw rate sensor 52, a gradient sensor 53, and a GPS (Global Positioning System) 62.

The storage device 64 is configured by, for example, a hard disk drive or an SSD (Solid State Drive. A storage device incorporated in a drive recorder or provided separately from a drive recorder may be used as the storage device 64.

Display device 70 is configured as, for example, a liquid crystal display. A display device incorporated in the drive recorder or provided separately from the drive recorder may be used as the display device 70.

The operation device 72 includes switches used for displaying an image (including a moving image) stored in the storage device 64 on the display device 70 or editing an image (including a moving image) displayed on the display device 70. An operation device incorporated in a drive recorder or provided separately from a drive recorder may be used as the operation device 72.

The communication device 74 has a function of transferring an image (including a moving image) to the portable device 120 by wire or wireless (for example, a Bluetooth® function). A communication device incorporated in a drive recorder or provided separately from a drive recorder may be used as the communication device 74.

The electronic control unit 30 is a microcomputer configured around a CPU31. In addition to CPU31, the electronic control unit 30 includes a ROM32 for storing a program or the like, a RAM32 for temporarily storing data, a flash memory 34 for storing data or the like, a time meter 35 having a timer function or the like, an input/output port (not shown). The electronic control unit 30 may be incorporated into the drive recorder or provided separately from the drive recorder. Further, in the electronic control unit 30, the unit performing driving control of the vehicle and the unit editing, storing, and transferring the images photographed by the camera 60 may be separate.

The signals from the various sensors are input via the input port to the electronic control unit 30. The signals input to the electronic control unit 30 via the input port may include an ignition signal from the ignition switch 42, a shift position from the shift position sensor 44 for detecting the position of the shift lever 43, an accelerator opening degree from the accelerator pedal position sensor 46 for detecting the amount of depression of the accelerator pedal 45, and a brake position from the brake pedal position sensor 48 for detecting the amount of depression of the brake pedal 47. Further, the signals input to the electronic control unit 30 via the input port may include the vehicle speed from the vehicle speed sensor 49, the wheel speed from the wheel speed sensor 50, the acceleration from the acceleration sensor 51, the yaw rate from the yaw rate sensor 52, the road surface gradient from the gradient sensor 53, GPS data (position information) from GPS62, and the like. Furthermore, the operation signals of the switches of the operation device 72, various signals indicating the state of the drive source 22 from the drive source 22 can also be mentioned as the signals input to the electronic control unit 30 via the input port.

The electronic control unit 30 outputs various control signals via the output port. Examples of the control signal output from the electronic control unit 30 via the output port may include a control signal for storing an image (including a moving image) photographed by the camera 40 with the time taken in the storage device 64, a control signal for storing a signal indicating the state of the vehicle detected by various sensors together with the time in the storage device 64, a transfer control signal for outputting the image (including a moving image) to the communication device 74 when the image is transferred to the portable device 120, and the like.

The portable device 120 is configured as a smartphone having, for example, a function of a microcomputer and a telephone. The application software for acquiring an image transferred from the in-vehicle device 20 by wire or wireless and communicating with the information management center 220 via a communication network such as the Internet or a telephone line is installed with the portable device 120.

The information management center 220 includes an image management server 230, an image storage device 240, and a communication device 250. The image management server 230 is composed of a general-purpose microcomputer, and includes a program for communicating with the portable device 120 and a program for evaluating an image acquired by communicating with the portable device 120. The image storage device 240 is composed of, for example, a hard disk drive or an SSD (Solid State Drive).

In the vehicle device 20 in the information management system 10 of the embodiment, regardless of whether the ignition switch 42 is turned on or off, an image photographed by the camera 60 is always stored in the storage device 64 together with the time taken by camera. In the in-vehicle device 20, the vehicle state detected by the various sensors 40 is also stored in the storage device 64 together with the detection time regardless of whether the ignition switch 42 is turned on or off. The vehicle status includes at least a portion of, for example, a vehicle speed from the vehicle speed sensor 49, a wheel speed from the wheel speed sensor 50, an acceleration from the acceleration sensor 51, a yaw rate from the yaw rate sensor 52, a road surface gradient from the gradient sensor 53, GPS data (position information) from GPS62, and the like. The photographing by the camera 60 and the detection of the vehicle state by the various sensors 40 may be limited to when the ignition switch 42 is turned on.

Figure 3:
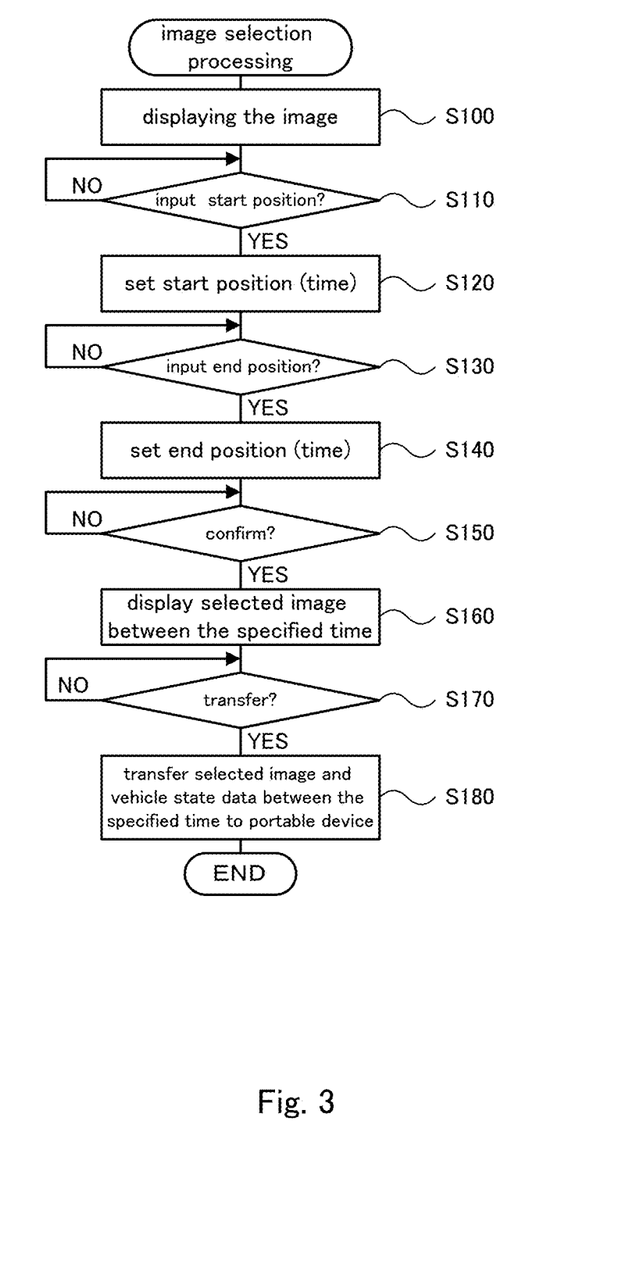
FIG. 3 is a flowchart showing an example of an image selection process performed by the electronic control unit 30 of the in-vehicle device 20 when the user selects an image.

Next, an operation of the information management system 10 according to the embodiment configured as described above will be described. The user operates the switches of the operation device 72 of the in-vehicle device 20 to display an image (including a still image and a moving image; hereinafter, the same) stored in the storage device 64 on the display device 72, and selects a range of images to be transmitted to the information management center 220. FIG. 3 is a flowchart showing an example of image selection process executed by the electronic control unit 30 of the in-vehicle device 20 when the user selects an image to be transmitted to the information management center 220.

When the image selection process is executed, the electronic control unit 30 starts displaying the image stored in the storage device 64 on the display device 70 (step S100). Next, the electronic control unit 30 waits for the start position (time) of the image to be transmitted to the information management center 220 to be input (step S110), and sets the input position (time) as the start position (time) (step S120). Specifically, when the user operates the fast-forward switch or the return switch of the operation device 72 to input the start position of the image (moving image) to be transmitted to the information management center 220, the position is set as the start position (start time). Next, the electronic control unit 30 waits for the end position (time) of the image to be input (step S130), the input position is set as the end position (time) (step S140). Similarly, when the user operates the fast-forward switch or the return switch of the operation device 72 to input the end position of the image to be transmitted to the information management center 220, the position is set as the end position. Hereinafter, an image from the start position (start time) to the end position (end time) will be referred to as a selected image (image with time).

Next, the electronic control unit 30 waits for the user to operate "confirm" on the selected images (step S150). When "Confirm" is operated by the user, the electronic control unit 30 displays the selected image on the display device 70 (step S160) and lets the user confirm the selected image. The confirmation process of the selected images in S150, S160 is optional, and the following process may be performed without the confirmation process.

Subsequently, the user connects the portable device 120 and the in-vehicle device 20 by wire or wirelessly, and the application software for acquiring an image transferred from the in-vehicle device 20 or communicating with the information management center 220 is activated in the portable device 120, and waits for the user to operate "transfer" of the selected image (step S170). When the "transfer" is operated by the user, the electronic control unit 30 transfers the image data of the selected image and the vehicle state data (vehicle state data with time; hereinafter referred to simply as "vehicle state data") detected by the various sensors 40 when the selected image is photographed to the portable device 120 (step S180), and ends the image selection process. It should be noted that the transfer process of this step S170 and S180 is also optional, and the image selection process may be terminated without the user operating "transfer". In this case, the process ends without transferring the selected image.

Figure 4:
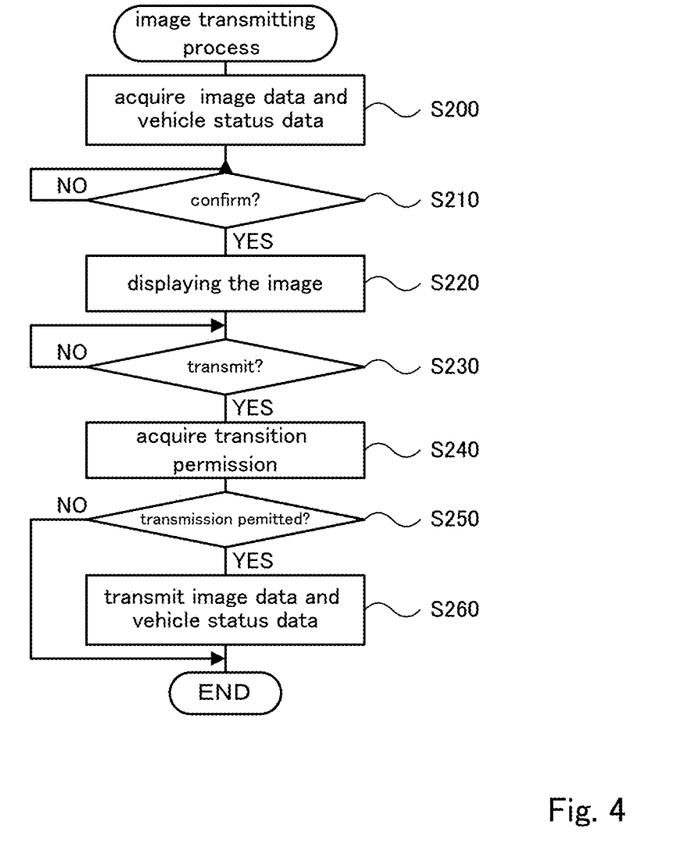
FIG. 4 is a flowchart showing an example of an image transmission process executed by the portable device 120.

Next, an operation of the portable device 120 that has received the transfer of the selected image will be described. FIG. 4 is a flowchart showing an example of image transmission process executed by the portable device 120. This process is executed when the portable device 120 and the in-vehicle device 20 are connected by wire or wireless, and application software for acquiring an image transferred from the in-vehicle device 20 of the portable device 120 or communicating with the information management center 220 is activated.

When the image transmission process is executed, the portable device 120 first acquires the image data of the selected image and the vehicle status data transferred from the in-vehicle device 20 (step S200). That is, when the step S200 is being executed, the step S170 and S180 of the image selection process of FIG. 3 is executed, whereby the image data of the selected image and the vehicle status data are transferred from the in-vehicle device 20 and acquired by the portable device 120. In the subsequent process, whether or not the portable device 120 is connected to the in-vehicle device 20 by wired or wireless connection does not matter.

Next, the electronic control unit 30 waits for user to operate "confirm" on the acquired selected image (step S210). When "confirm" is operated by the user, the portable device 120 displays the selected image on the display of the portable device 120 (step S220), and lets the user to confirm the selected image. The confirmation process of the selected images in S210 and S220 is optional, and the following process may be performed without the confirmation process.

Subsequently, the electronic control unit 30 waits for user to operate "transmission" on the selected image (step S230). When "transmission" is operated by the user, the portable device 120 accesses the information management center 220 to acquire whether or not transmission is permitted (step S240), and determines whether or not transmission is permitted (step S250). The permission/denial of transmission is performed by executing the transmission and reception permission process of FIG. 5 by the image management server 230 of the information management center 220. The process of such setting will be described later. When it is determined in step S250 that the transmission is permitted, the image data of the selected image and the vehicle-state data are transmitted to the information management center 20 (step S260), and the image transmission process is terminated. On the other hand, when it is determined in the step S250 that the transmission is not permitted, the image transmission process is terminated without transmitting the selected image. The transmission process of steps S230 to 260 is optional, and the user may terminate the image transmission process without operating "transmission". In this case, the process ends without transmitting the selected image.

Next, the transmission and reception permission process executed by the image management server 230 of the information management center 220 when obtaining the permission or denial of transmission of the step S240 (FIG. 5) will be described. When the transmission and reception permission process is executed, the image management server 230 first checks whether or not it is logged in from the portable device 120 (step S300). When it is determined that the user is not logged in from the terminal 120, the transmission/reception availability process ends.

Figure 5:
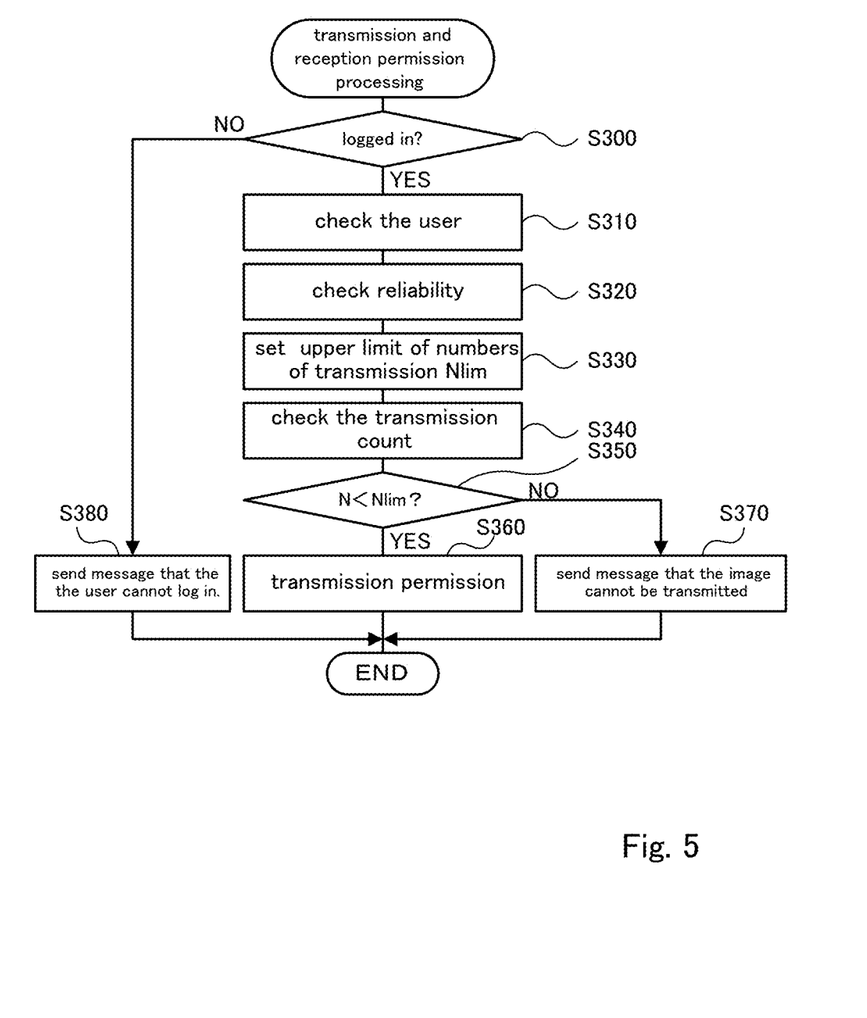
FIG. 5 is a flowchart showing an example of transmission and reception permission process executed by the image management server 230.

When it is determined in step S300 that the user is logged in from the portable device 120, the image management server 230 checks the user (step S310). The user is verified based on the user ID and password input from the portable device 120. The image management server 230 checks the reliability of the user (step S320). The user's reliability is set based on the determination result of the rare image for the selected image transmitted in the past from the user. For example, as the user's reliability, a ratio of the number of times the selected image is determined to be a rare image to the number of times the selected image has been transmitted in the past from the user can be used. Then, an upper limit of numbers of transmission Nlim per predetermined period (e.g., per year or per month) is set based on the reliability of the user (step S330). For example, when the upper limit of numbers of transmission Nlim per predetermined period uses the ratio of the number of times that the selected image is determined to be a rare image for the number of times that the selected image has been transmitted in the past from the user as the reliability of the user, the upper limit of numbers of transmission Nlim per predetermined period can be determined to be one for the value of 0 to 0.2, two for the reliability of 0.2 to 0.4, three for the reliability of 0.4 to 0.6, four for the reliability of 0.6 to 0.8, and five for the reliability of 0.8 to 1.0. For a user who has never transmitted the selected image to the information management center 220, the initial value of the reliability can be used as 0.5 or the like.

Subsequently, the electronic control unit 30 checks the transmission count N within a predetermined period from the present user (step S340), the transmission count N of the user is less than the upper limit of numbers of transmission Nlim is determined (step S350). When it is determined that the transmission count N of the user is less than the upper limit of numbers of transmission Nlim, the transmission of the selected image is permitted (step S360), and the transmission and reception permission process ends. On the other hand, when it is determined that the user's number of transmissions N is equal to or greater than the upper limit of numbers of transmission Nlim, a message indicating that the selected image cannot be transmitted (for example, a message indicating that the number of transmissions of the image has been exceeded) is transmitted (step S360), and transmission and reception permission process is terminated.

It is possible to prevent the selection image from being transmitted indefinitely from the user by such transmission and reception permission process (FIG. 5). This enables to prevent the communication and process of the image management server 230 from becoming excessively large.

Figure 6:
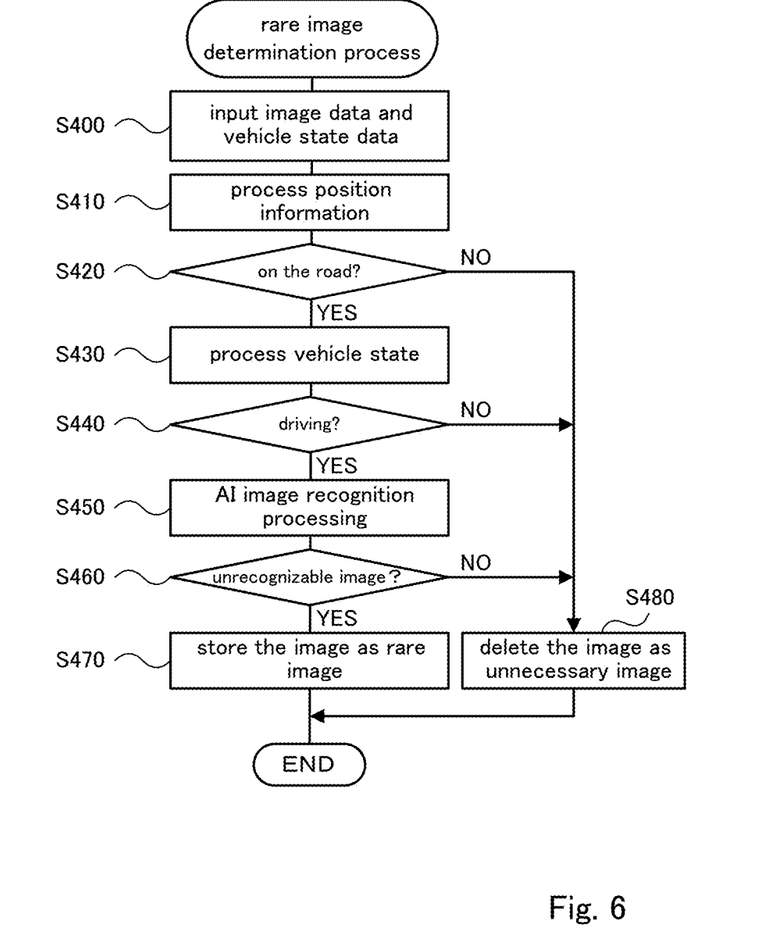
FIG. 6 is a flowchart showing an example of a rare image determination process executed by the image management server 230.

In the information management center 220, once receiving the image data and the vehicle state data of the selected image transmitted from the portable device 120, and the information management center 220 stores the data and executes the determination process (rare image determination process) that whether selected image is a rare image or not. FIG. 6 is a flowchart showing an example of the rare image determination process executed by the image management server 230.

When the rare image determined process is executed, the image managing server 230 first inputs the image data of the selected image and the vehicle state data as the target of the determination of the rare image (step S400). Subsequently, it is determined whether or not the shooting position of the selected image is on the road based on the GPS data (position information) included in the image data or the vehicle state data of the selected image (step S410, S420). For example, GPS data can be compared to a map to determine whether it is on a road. When it is determined that the photographing position of the selected image is not on the roads, the selected image does not correspond to the rare image and is determined to be an unnecessary image, the image data of the selected image and the vehicle-state data are deleted (step S480), and the rare image determination process is terminated.

When it is determined in the step S420 that the photographing position of the selected image is on the road, it is determined whether or not the photographing of the selected image has been performed while the vehicle is running based on the vehicle status data (step S430, S440). For example, it is possible to determine whether or not the vehicle is traveling based on whether or not the vehicle speed is equal to or higher than a threshold value, such as 3 km/h or 5 km/h. When it is determined that the photographing of the selected image is not performed while the vehicle is running, the selected image does not correspond to the rare image and is determined to be an unnecessary image, the image data of the selected image and the vehicle state data are deleted (step S480), and the rare image determination process is terminated.

When it is determined in step S440 that the photographing of the selected image is being performed during the driving, the AI image recognition process is performed on the selected image (step S450), and it is determined whether or not an object or an event in the selected image has been recognized (step S460). In the AI image recognition process, in the embodiment, a solution is given to the objects and events in each image with respect to a large number of images determined to be rare images and stored in the image storage device 240, and the objects and events in each image are subjected to process learning, and the objects and events in the selected image are recognized using the learned model obtained by the machine learning. This machine learning is repeatedly performed at a timing at which a selected image as a rare image is accumulated in the image accumulating device 240, at a timing every predetermined period, or at a desired timing, and the AI image recognition process is updated. Therefore, when it is determined that the object or event of the selected image cannot be recognized by the AI image recognition process, the selected image is determined to be a rare image, the selected image is accumulated in the image accumulating device 240 (step S470), and the rare image determination process is terminated. On the other hand, when it is determined that the object or event of the selected image can be recognized by the AI image recognition process, it is determined that the selected image is not a rare image but an unnecessary image, the image data of the selected image and the vehicle state data are deleted (step S480), and the rare image determination process is terminated.

By such rare image determination process, only an image photographed while traveling on the road among the selected images transmitted from the portable device 120, in which an object or an event of the image cannot be recognized by the AI image recognition process, can be stored in the image storage device 240 as a rare image. By such rare image determination process, only an image photographed while traveling on the road among the selected images transmitted from the portable device 120, in which an object or an event of the image cannot be recognized by the AI image recognition process, can be stored in the image storage device 240 as a rare image. The rare image stored in the image storage device 240 is not only used in the above-described AI image recognition process, but also used for image recognition process in automatic operation, analysis of an accident, accident information, and the like when the rare image is an accident image.

In the information management system 10 of the embodiment described above, the in-vehicle device 20 transfers the image data of the selected image selected by the user of the photographed image stored with the photographed time by the camera 60 and the vehicle state data at the time of photographing the selected image to the portable device 120. The portable device 120 transmits the image data of the selected image and the vehicle state data to the image management server 230 of the information management center 220 only when the transmission is permitted by the user. The image management server 230 determines whether or not the selected image is a rare image using the image data of the selected image and the vehicle state data received from the portable device 120, and when the selected image is determined to be a rare image, the image data of the selected image and the vehicle state data are stored in the image storage device 240. As described above, in the information management system 10 of the embodiment, the image data of the selected image and the vehicle state data selected by the user are transferred to the portable device 120, and the image data of the selected image and the vehicle state data are transmitted to the image management server 230 only when the transmission is permitted by the user. For this reason, it is possible to reduce the amount of communication and the frequency of communication of an image including a rare image between the user and the image management server 230, as compared with a case where a selected image that matches a predetermined condition is automatically transmitted to the image management server. Since the image management server 230 determines whether or not the selected image is a rare image for the selected image selected and permitted by the user and transmitted from the portable device 120, it is possible to impose a step sufficient for determining the rare image. As a result, this enables to more appropriately determine and accumulate the rare image.

In the image management server 230 of the information management system 10 of the embodiment, when the selected image is not photographed while driving on the road, it is assumed that the determination of the rare image by the AI image recognition process is not performed. However, it may be assumed that the determination of the rare image by the AI image recognition process if the selected image is taken on the road even if it is not running, or that the determination of the rare image by the AI image recognition process if the selected image is taken on the road even if it is not on the road, or that the determination of the rare image by the AI image recognition process with respect to the selected image taken regardless of whether or not it is on the road.

In the image management server 230 of the information management system 10 of the embodiment, when the selected image is not photographed while driving on the road, it is assumed that the determination of the rare image by the AI image recognition process is not performed. However, the rare image may be determined by the AI image recognition process with respect to a predetermined condition, for example, a state in which the acceleration is equal to or greater than the first threshold value or less than the second threshold value, a state in which the yaw rate is equal to or greater than the third threshold value or less than the fourth threshold value, or a state in which the road surface gradient is equal to or greater than the fifth threshold value or less than the sixth threshold value.

In the information management system 10 of the embodiment, when the image data of the selected image and the vehicle state data are transmitted from the portable device 120 to the image management server 230, the transmission of the image data of the selected image and the vehicle state data is permitted only when the number of transmissions N within a predetermined period of the user is less than the upper limit of numbers of transmission Nlim determined in accordance with the reliability of the user. However, the number of transmissions based on the reliability of the user may not be limited.

In the embodiment, the present invention has been described as a form of the information management system 10, but it may be a form of the in-vehicle device 20 provided in the information management system 10, a form of the portable device 120 provided in the information management system 10, or a form of the image management server 230 provided in the information management system 10.

In the information management system of the present invention, the determining means of the image management server may determine whether or not the selected image is a rare image by evaluating the selected image based on a past image stored in the image storage device. This enables to use the past image stored in the image storage device. In this case, the determining means of the image management server may determine that the image is a rare image when the object or event in the selected image cannot be recognized based on the result of learning about the object or event in the past image accumulated in the image accumulating device. That is, whether the selected image is a rare image may be determined on the basis of whether the object or event in the selected image can be recognized by the artificial intelligence image recognition process constructed by image recognition of the object or event in the past image accumulated in the image accumulation device. In these cases, the determination means of the image management server may be configured to determine whether the selected image is a rare image when the selected image is an image photographed while driving on the road based on the selected vehicle state. In this way, it can be limited to images photographed when the vehicle is traveling on the road.

The information management system of the present invention, wherein the image management server may include restriction means that restricts reception of the selected image from the portable device based on a result of determination of the rare image from the selected image received in the past from the portable device. This enables to increase the reception of the selected image from the user who sends the rare image with high frequency, to reduce the reception of the selected image from the user who sends the rare image with low frequency, and to reduces the communication amount and the communication frequency of the moving image including the rare image between the user and the image management server. In addition, unnecessary process in the image management server can be reduced.

In the image management server of the present invention, the determining means may determine whether the selected image is a rare image by evaluating the selected image based on a past image stored in the image storage device. In the image management server of the present invention, the determining means may determine whether the selected image is a rare image by evaluating the selected image based on a past image stored in the image storage device. In this case, the determining means may determine that the image is a rare image when the object or event in the selected image cannot be recognized based on the result of learning about the object or event in the past image accumulated in the image accumulating device. That is, whether the selected image is a rare image may be determined on the basis of whether the object or event in the selected image can be recognized by the artificial intelligence image recognition process constructed by image recognition of the object or event in the past image accumulated in the image accumulation device. In these cases, the determining means may determine whether or not the selected image is a rare image when the selected image is an image captured while driving on a road based on the selected vehicle state. In this way, it can be limited to images taken when the vehicle is traveling on the road.

The image management server of the present invention may include restriction means that restricts the reception of the selected image from the portable device based on the determination result of the rare image with respect to the selected image received in the past from the portable device. This enables to increase the reception of the selected image from the user who sends the rare image with high frequency, to reduce the reception of the selected image from the user who sends the rare image with low frequency, and to reduce the communication amount and the communication frequency of the moving image including the rare image between the user and the image management server. In addition, unnecessary process in the image management server can be reduced.

The following describes the correspondence relationship between the primary components of the embodiment and the primary components of the disclosure described in Summary. In the embodiment, the camera 60 corresponds to a camera, various sensors 40 corresponds to a sensor, the storage device 64 corresponds to a storage device, the communication device 74 corresponds to a transfer device, the electronic control unit 30 corresponds to a control device, the in-vehicle device 20 corresponds to an in-vehicle device. The portable device 120 corresponds to a "portable device", the image management server 230 corresponds to an "image management server", and the image storage device 240 corresponds to an "image storage device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The present invention can be applied to the manufacturing industry of an information management system and an in-vehicle device, a portable device, and an image management server used for the information management system.

The invention claimed is:

1. An information management system, comprising:
an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device;

a portable device configured to acquire and transmit the photographed image and the detected vehicle state transferred from the transfer device;

an image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the portable device transmits the selected image and the selected vehicle state to the image management server only when transmission is permitted by the user, wherein the image management server includes determining means that determines whether the selected image is a rare image using the selected image and the selected vehicle state received from the portable device, and an image storage device that stores the selected image when the selected image is determined to be the rare image by the determining means; and a display, wherein the control device is configured to instruct the display to display the photographed image from among a plurality of photographed images from which the user performs the selection and to determine selection by the user based on the displayed photographed image.

2. The information management system according to claim 1, wherein the determining means of the image management server determines whether the selected image is the rare image by evaluating the selected image based on a past image stored in the image storage device.

3. The information management system according to claim 2, wherein the determining means of the image management server determines that the image is the rare image when the object or event in the selected image cannot be recognized based on a result of learning about the object or event in the past image stored in the image storage device.

4. The information management system according to claim 2, wherein the determining means of the image management server determines whether or not the selected image is the rare image when the selected image is an image photographed while driving on a road based on the selected vehicle state.

5. The information management system according to claim 1, wherein the image management server comprises restriction means that restricts reception of the selected image from the portable device based on a result of determination of the rare image from the selected image received in the past from the portable device.

6. In-vehicle device used in the information management system, wherein the information management system comprising:

the in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device;

a portable device configured to acquire and transmit the photographed image and the detected vehicle state transferred from the transfer device;

an image management server configured to receive the photographed image and the detected vehicle state transmitted from the portable device, wherein the portable device transmits the selected image and the selected vehicle state to the image management server only when transmission is permitted by the user, wherein the image management server includes determining means that determines whether the selected image is a rare image using a selected image and a selected vehicle state received from the portable device, and an image storage device that stores the selected image when the selected image is determined to be the rare image by the determining means, wherein the control device of the in-vehicle device configured to transfer a selected image selected by a user from the photographed images stored in the storage device and a selected vehicle state, which is a vehicle state when the selected image is photographed stored in the storage device to the portable device; and a display, wherein the control device is configured to instruct the display to display the photographed image from among a plurality of photographed images from which the user performs the selection and to determine selection by the user based on the displayed photographed image.

7. A portable device used in the information management system, wherein the information management system comprising:

an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device;

the portable device configured to acquire and transmit the photographed image and the detected vehicle state transferred from the transfer device; and an image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the image management server includes determining means that determines whether the selected image is a rare image using the selected image and the selected vehicle state received from the portable device, and an image storage device that stores the selected image when the selected image is determined to be the rare image by the determining means, wherein the portable device configured to transmit the selected image and the selected vehicle state to the image management server only when transmission is permitted by the user, wherein the in-vehicle system or the portable device further comprises a display, wherein the control device is configured to instruct the display to display the photographed image from among a plurality of photographed images from which the user performs the selection and to determine selection by the user based on the displayed photographed image.

8. An image management server used in the information management system, wherein the information management system comprising:

an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device;

a portable device configured to acquire and transmit the photographed image and the detected vehicle state transferred from the transfer device; and the image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the portable device transmits the selected image and the selected vehicle state to the image management server only when transmission is permitted by the user, wherein the image management server comprising determining means that determines whether the selected image is a rare image using the selected image and the selected vehicle state received from the portable device, and an image storage device that stores the selected image when the selected image is determined to be the rare image by the determining means, wherein the in-vehicle system or the portable device further comprises a display, wherein the control device is configured to instruct the display to display the photographed image from among a plurality of photographed images from which the user performs the selection and to determine selection by the user based on the displayed photographed image.

9. The image management server according to claim 8, wherein the determining means determines whether the selected image is the rare image by evaluating the selected image based on a past image stored in the image storage device.

10. The image management server according to claim 9, wherein the determining means of the image management server determines that the image is the rare image when the object or event in the selected image cannot be recognized based on a result of learning about the object or event in the past image stored in the image storage device.

11. The image management server according to claim 9, wherein the determining means of the image management server determines whether or not the selected image is the rare image when the selected image is an image photographed while driving on a road based on the selected vehicle state.

12. The image management server according to claim 9, wherein the image management server comprises restriction means that restricts reception of the selected image from the portable device based on a result of determination of the rare image from the selected image received in the past from the portable device.

13. The information management system according to claim 1, wherein the portable device is removable from the vehicle.

14. The in-vehicle device according to claim 6, wherein the portable device is removable from the vehicle.

15. The portable device according to claim 7, wherein the portable device is removable from the vehicle.

16. The image management server according to claim 8, wherein the portable device is removable from the vehicle.

* * * * *